United States Patent [19]

Harada

[11] Patent Number: 4,723,149
[45] Date of Patent: Feb. 2, 1988

[54] IMAGE FORMING APPARATUS HAVING A FUNCTION FOR CHECKING TO COPY A SECRET DOCUMENT

[75] Inventor: Kentaro Harada, Yokohama, Japan

[73] Assignee: Kabushiki Kaisha Toshiba, Kawasaki, Japan

[21] Appl. No.: 860,007

[22] Filed: May 5, 1986

[30] Foreign Application Priority Data

May 8, 1985 [JP] Japan .................................. 60-97313
May 13, 1985 [JP] Japan ................................ 60-100918

[51] Int. Cl.$^4$ ........................................... G03G 15/00
[52] U.S. Cl. .................................... 355/14 R; 355/133
[58] Field of Search ...................... 355/14 R, 3 R, 133, 355/7, 8

[56] References Cited

U.S. PATENT DOCUMENTS 3,977,785  8/1976  Harris ................................... 355/133
4,486,090 12/1984  Warhol ............................ 355/133 X
4,586,811  5/1986  Kubo et al. ...................... 355/3 R X

OTHER PUBLICATIONS

*IBM Tech. Disc. Bull.*, "Preventing Copying of Classified Information", vol. 19, No. 4, Sep. '76, p. 1469.

*Primary Examiner*—R. L. Moses
*Attorney, Agent, or Firm*—Cushman, Darby & Cushman

[57] ABSTRACT

An image forming apparatus for checking the copying of secret documents. The apparatus includes an original table on which original documents are placed. If the original document is a secret document, it is provided with a predetermined identification section. Scanning and image forming apparatus is provided which forms an image of the document when authorized to do so. In operation, secret document detecting apparatus detects whether or not a secret document identification section is present on a given document to be copied. First controlling apparatus is provided for driving the scanning apparatus prior to an image forming scan. Second controlling apparatus is provided for either enabling or disabling the image forming apparatus depending on whether a secret document is present. Third and fourth controlling apparatus is provided for driving the image forming apparatus in accordance with a displacement command of a light transmitting means which performs erasure of specified portions of the secret document by transmitting light through the original at specified erasure locations.

5 Claims, 44 Drawing Figures

F I G. 1
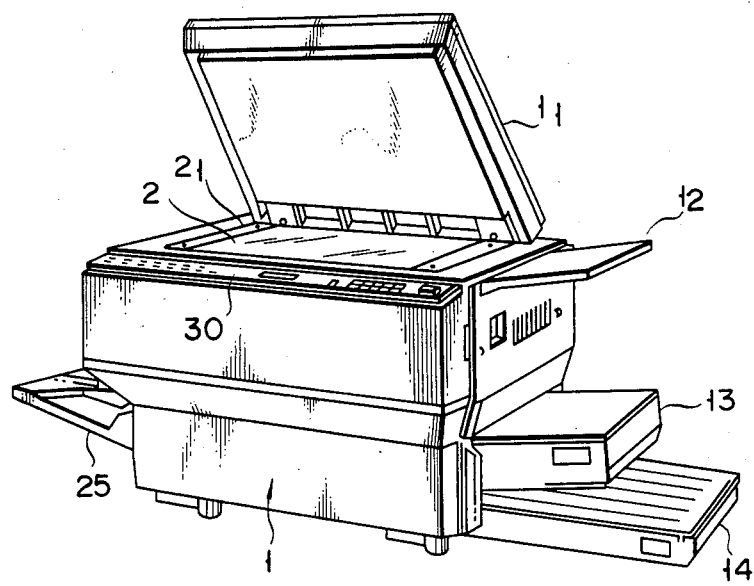
F I G. 2
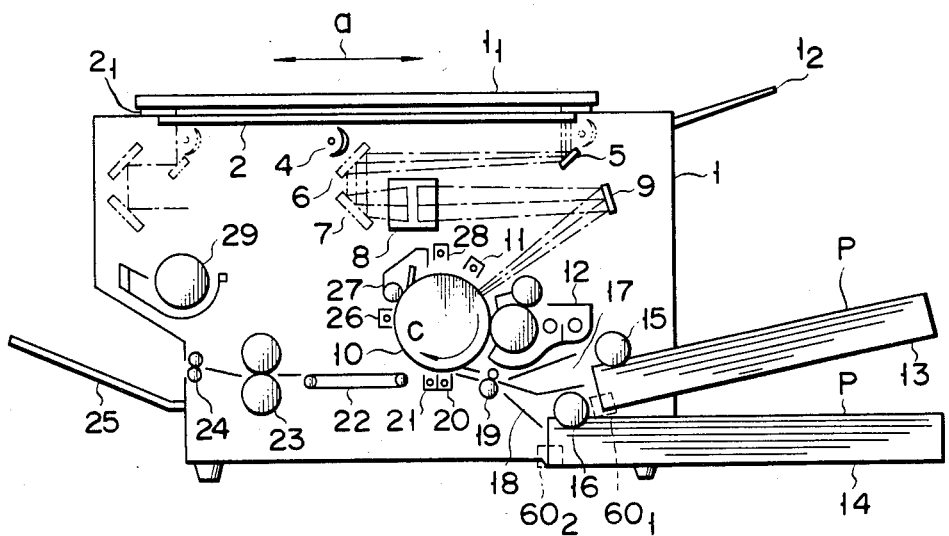

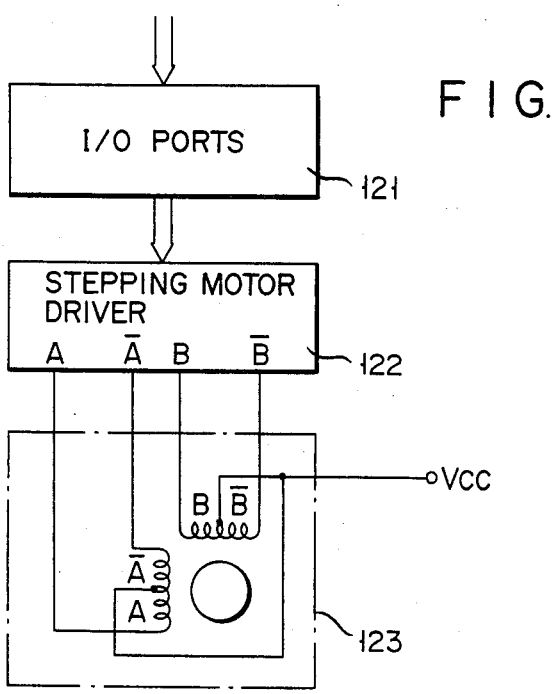
FIG. 11
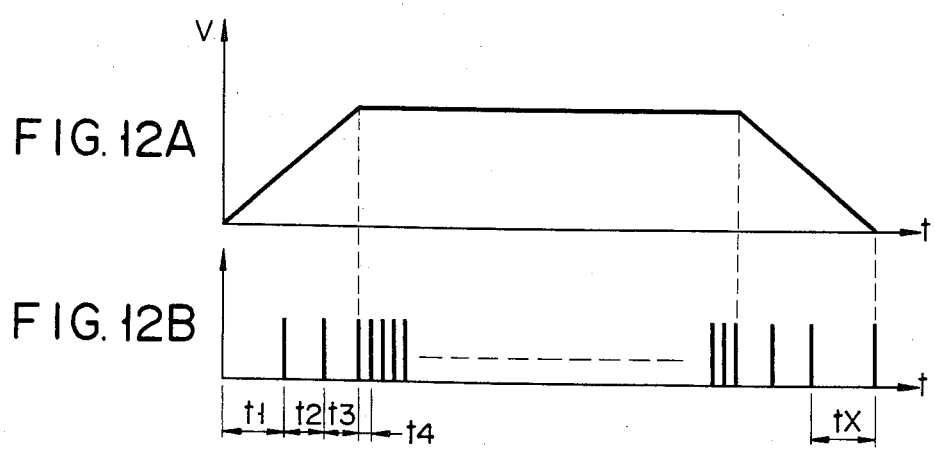
FIG. 12A
FIG. 12B

F I G. 14
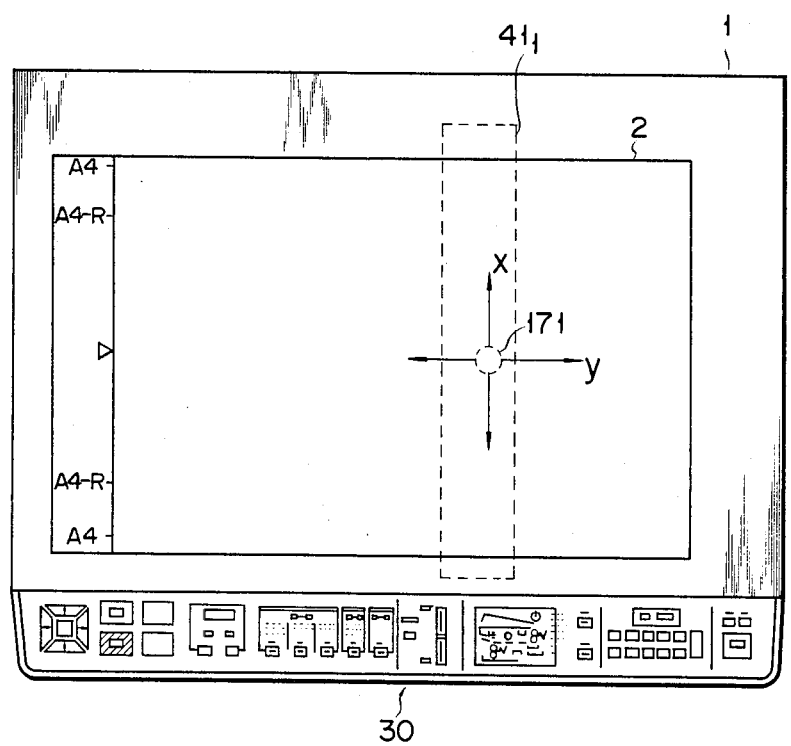

F I G. 23
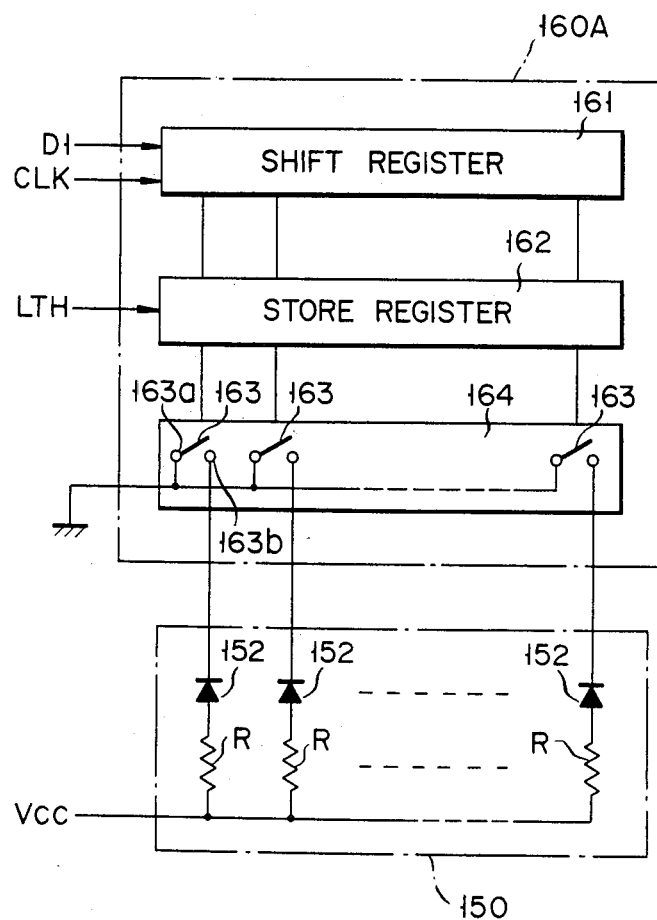

F I G. 25
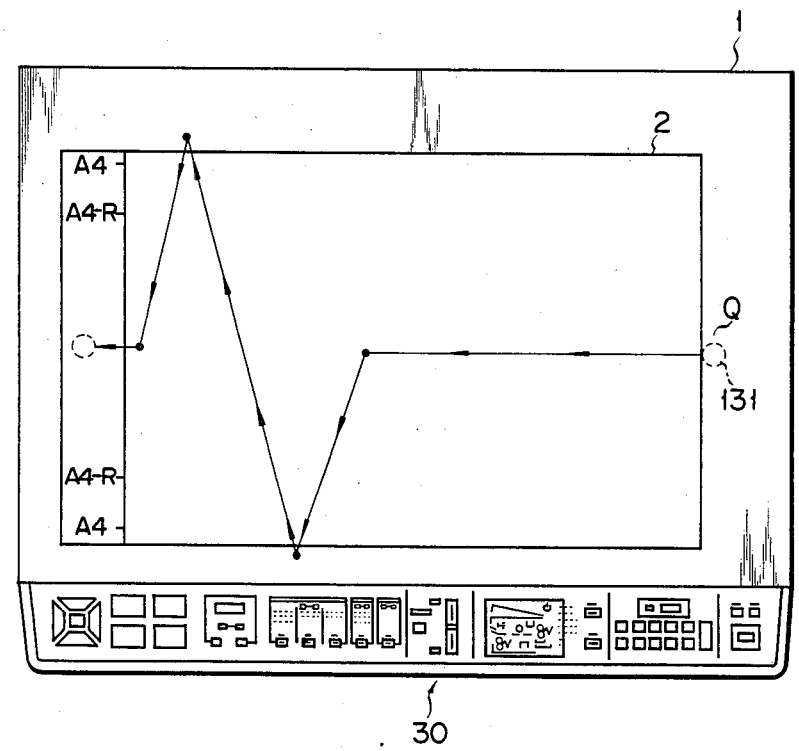

F I G. 27
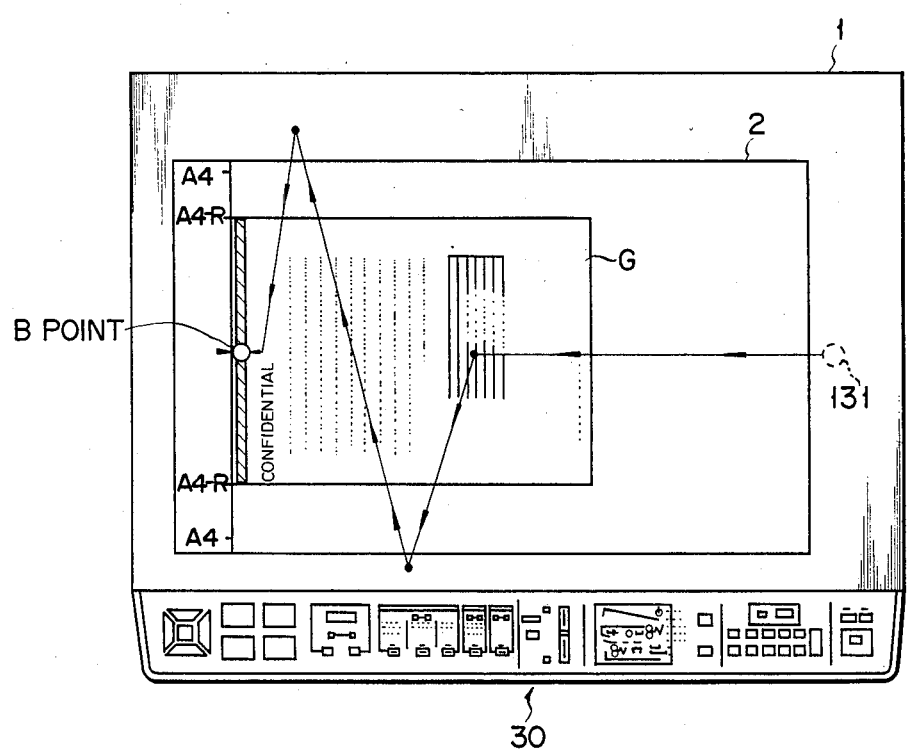

F I G. 28
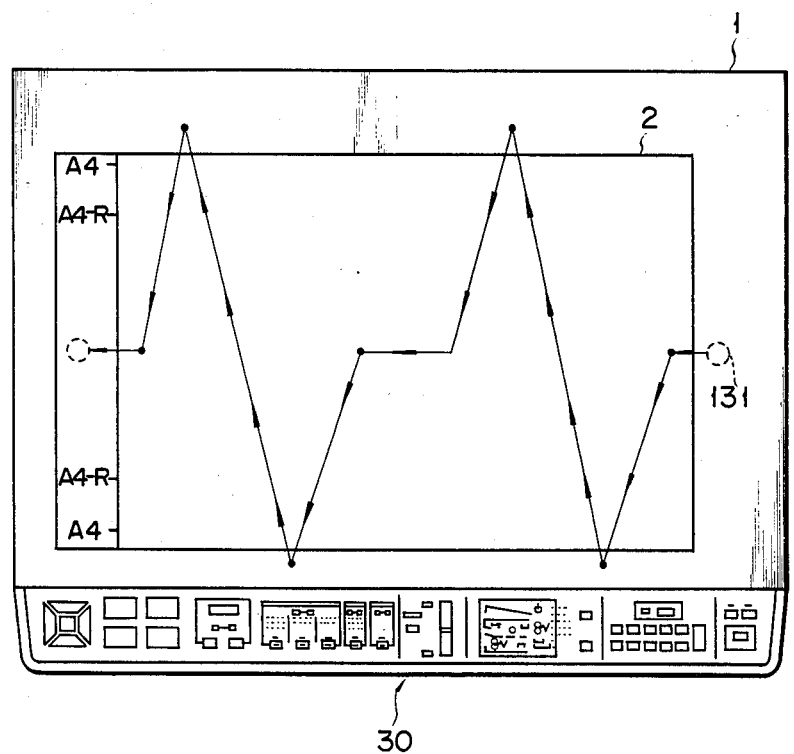

F I G. 29
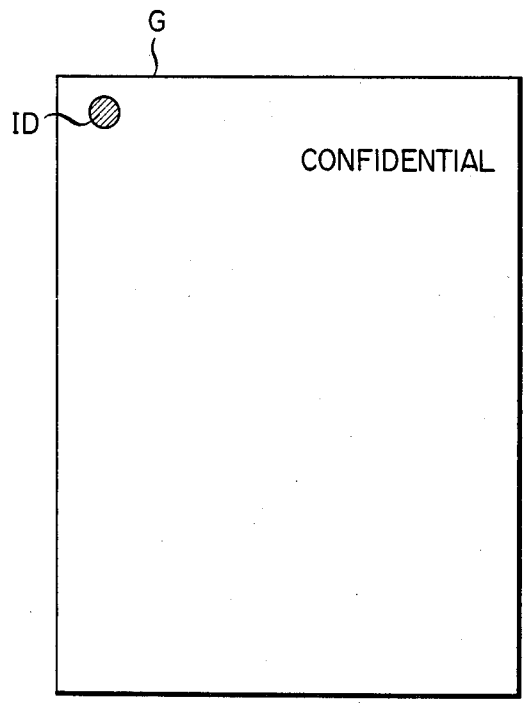

001
IMAGE FORMING APPARATUS HAVING A FUNCTION FOR CHECKING TO COPY A SECRET DOCUMENT

BACKGROUND OF THE INVENTION

This invention relates to an image forming apparatus having a function for checking copying of a secret document and suitably adapted as an electronic copying machine.

Conventional copying machines have functions for copying original images in equal, enlarged and reduced sizes.

Since conventional copying machines can copy a secret document as well as a normal document, it is difficult to completely protect a secret even if the secret document is not brought out. It is preferable if copying of a secret document can be detected.

In addition, original images often contain unnecessary portions. However, many conventional copying machines cannot selectively copy only a desired region of the original image.

Therefore, if a copying machine is multifunctioned so that secret documents are protected from being copied, and a copying region can be selected, this will result in convenience. However, a conventional multifunctional copying machine often has a complicated arrangement.

SUMMARY OF THE INVENTION

It is, therefore, an object of the present invention to provide a new and improved image forming apparatus having a function for checking or detecting copying of a secret document.

It is another object of the present invention to provide an image forming apparatus which can reliably carry out a secret document copy protection function and an image forming region selection function while maintaining a simple arrangement.

According to the present invention, there is provided an image forming apparatus having a function for checking copying of a secret document, the apparatus comprising:

an original table on which an original is placed, the original, if it is a secret document, being provided with a predetermined identification section;

original scanning means, movable along the original table, for optically scanning the original placed on the original table to obtain image data;

image forming means for forming an image corresponding to the image data from the original scanning means on an image forming medium;

secret document detecting means provided integrally with the original scanning means and having a sensor for detecting the predetermined identification section of the secret document;

first controlling means for driving the document scanning means prior to an image forming operation by the original scanning means and the image forming means, and for generating a first control signal for two-dimensionally scanning the original placed on the original table with the sensor of the secret document detecting means; and second controlling means for generating a second control signal for enabling or disabling the image forming operation in accordance with a detection result from the secret document detecting means, thereby preventing copying of the secret document.

BRIEF DESCRIPTION OF THE DRAWINGS

These and other objects and features of the present invention can be understood through the following embodiment by reference to the accompanying drawings.

FIGS. 1 to 29 show a first embodiment of an image forming apparatus according to the present invention, in which:

FIGS. 1 and 2 are a schematic perspective view and a side sectional view, respectively, showing the construction of the image forming apparatus;

FIG. 3 is a plan view of a control panel;

FIG. 4 is a perspective view showing an arrangement of drive sections;

FIG. 5 is a perspective view schematically showing a drive mechanism for an optical system;

FIG. 6 is a perspective view schematically showing a drive mechanism for indexes;

FIG. 7 is a block diagram showing a general control circuit;

FIG. 8 is a functional block diagram of a main processor group;

FIG. 9 is a functional block diagram of a first sub-processor group;

FIG. 10 is a functional block diagram of a second sub-processor group;

FIG. 11 is a block diagram of a stepping motor control circuit;

FIGS. 12A and 12B are charts for explaining a method of controlling stepping motor speed;

FIGS. 14, 15, 16, and 17 are plan views illustrating an operation for specifying the erasure range of the original using the spot light source;

FIGS. 20 and 21 are a perspective view and a front view, respectively, of only the principal part of the erasure array, showing the relationship between the erasure array and a photosensitive drum;

FIG. 23 is a circuit diagram illustrating the configuration of an array drive section;

FIG. 24 is an illustration for explaining an original containing a secret document;

FIGS. 25, 26, and 27 are plan views for explaining an operation for detecting the original containing the secret document;

FIG. 28 is a plan view of another arrangement of an identification section; and

FIG. 29 is an illustration for explaining an original containing a secret document;

FIGS. 30, 31, and 32 show a second embodiment of an image forming apparatus according to the present invention, in which:

FIG. 30 is a schematic perspective view of a magnetic sensor;

FIG. 31 is a plan view of a control panel; and

FIG. 32 is a block diagram showing a general control circuit; and

FIGS. 33A, 33B, and 33C show a third embodiment of an image forming apparatus according to the present invention, in which:

FIGS. 33A and 33B are side sectional views of a principal part of a spot light source; and FIG. 33C is a plan view showing the relationship between spot light and auxiliary light.

DETAILED DESCRIPTION OF THE PREFERRED EMBODIMENTS

Figure 3:
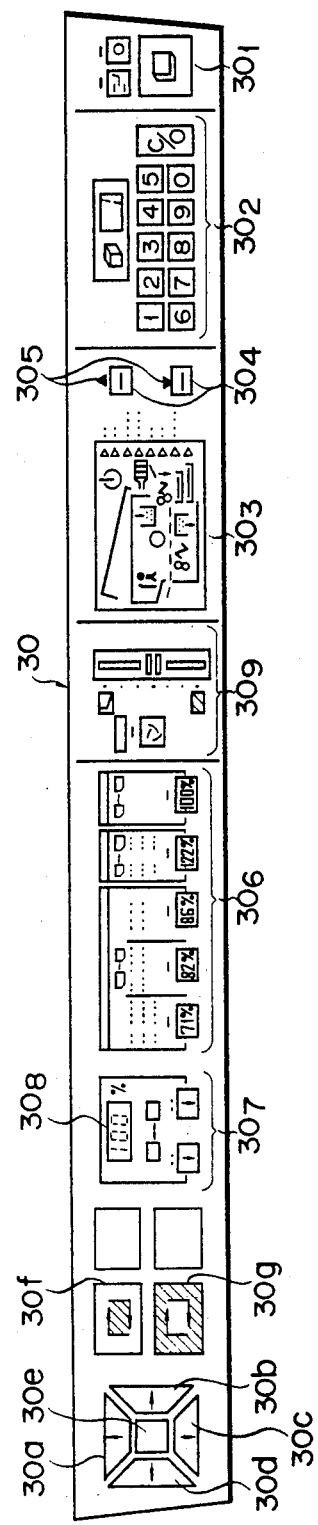

Preferred Embodiments of the present invention will be described with reference to the accompanying drawings.

FIGS. 1 and 2 schematically show a copying machine as an image forming apparatus according to a first embodiment of the present invention. Reference numeral 1 denotes a copying machine housing. An original table (i.e., a transparent glass) 2 is fixed on the upper surface of the housing 1. An openable original cover $1_1$ and a work table $1_2$ are arranged near the table 2. A fixed scale $2_1$ as a reference for setting an original is arranged at one end of the table 2 along the longitudinal direction thereof.

The original set on the original table 2 is scanned for image exposure as an optical system 3 including an exposure lamp 4 and mirrors 5, 6 and 7 reciprocates in the direction indicated by arrow a along the under surface of the original table 2. In this case, the mirrors 6 and 7 move at a speed half that of the mirror 5 so as to maintain a fixed optical path length.

A reflected light beam from the original scanned by the optical system 3, that is, irradiated by the exposure lamp 4, is reflected by the mirrors 5, 6 and 7, transmitted through a lens block 8 for magnification or reduction, and then reflected by a mirror 9 to be projected on a photosensitive drum 10. Thus, an image of the original is formed on the surface of the photosensitive drum 10.

The photosensitive drum 10 rotates in the direction indicated by arrow c so that its surface is wholly charged first by a main charger 11. The image of the original is projected on the charged surface of the photosensitive drum 10 by slit exposure, forming an electrostatic latent image on the surface. The electrostatic latent image is developed into a visible image (toner image) by a developing unit 12 using toner. Paper sheets (image record media) P are delivered one by one from an upper paper cassette 13 or a lower paper cassette 14 by a paper-supply roller 15 or 16, and guided along a paper guide path 17 or 18 to an aligning roller pair 19. Then, each paper sheet P is delivered to a transfer region by the aligning roller pair 19, timed to the formation of the visible image.

The two paper cassettes 13 and 14 are removably attached to the lower right end portion of the housing 1, and can be alternatively selected by operation on a control panel which will be described in detail later. The paper cassettes 13 and 14 are provided respectively with cassette size detecting switches $60_1$ and $60_2$ which detect the selected cassette size. The detecting switches $60_1$ and $60_2$ are each formed of a plurality of microswitches which are turned on or off In response to insertion of cassettes of different sizes.

The paper sheet P delivered to the transfer region comes into intimate contact with the surface of the photosensitive drum 10, in the space between a transfer charger 20 and the drum 10. As a result, the toner image on the photosensitive drum 10 is transferred to the paper sheet P by the agency of the charger 20. After the transfer, the paper sheet P is separated from the photosensitive drum 10 by a separation charger 21 and transported by a conveyor belt 22. Thus, the paper sheet P is delivered to a fixing roller pair 23 as a fixing unit arranged at the terminal end portion of the conveyor belt 22. As the paper sheet P passes through the fixing roller pair 23, the transferred image is fixed on the sheet P. After the fixation, the paper sheet P is discharged into a tray 25 outside the housing 1 by an exit roller pair 24.

After the transfer, moreover, the photosensitive drum 10 is de-electrified by a de-electrification charger 26, when the residual toner on the surface of the drum 10 is removed by a cleaner 27. Thereafter, a residual image on the photosensitive drum 10 is erased by a discharge lamp 28 to restore the initial state. In FIG. 2, numeral 29 designates a cooling fan for preventing the temperature inside the housing 1 from rising.

FIG. 3 shows a control panel 30 mounted on the housing 1. The control panel 30 carries thereon a copy key $30_1$ for starting the copying operatIon, ten-keys $30_2$ for setting the number of copies to be made and the like, a display section $30_3$ for indicating the operating conditions of the individual parts or paper jamming, cassette selection keys $30_4$ for alternatively selecting the upper or lower paper cassette 13 or 14, and cassette display sections $30_5$ for indicating the selected cassette. The control panel 30 is further provided with ratio setting keys $30_6$ for setting the enlargement or reduction ratio of copy selected among several predetermined ratios, zoom keys $30_7$ for adjustably setting the enlargement or reduction ratio, a display section $30_8$ for displaying the set radio, and a density setting section $30_9$ for setting the copy density. Additionally arranged on the control panel 30 are operation keys $30a$, $30b$, $30c$ for shifting a spot light source (mentioned later) which serves to indicate as erasure area an unnecessary portion fo the original, a position designating key $30e$ for inputting the coordinate positions indicated by the spot light source, and erasure range designating keys $30f$ and $30g$ for designating the erasure ranges in the designated positions.

Figure 4:
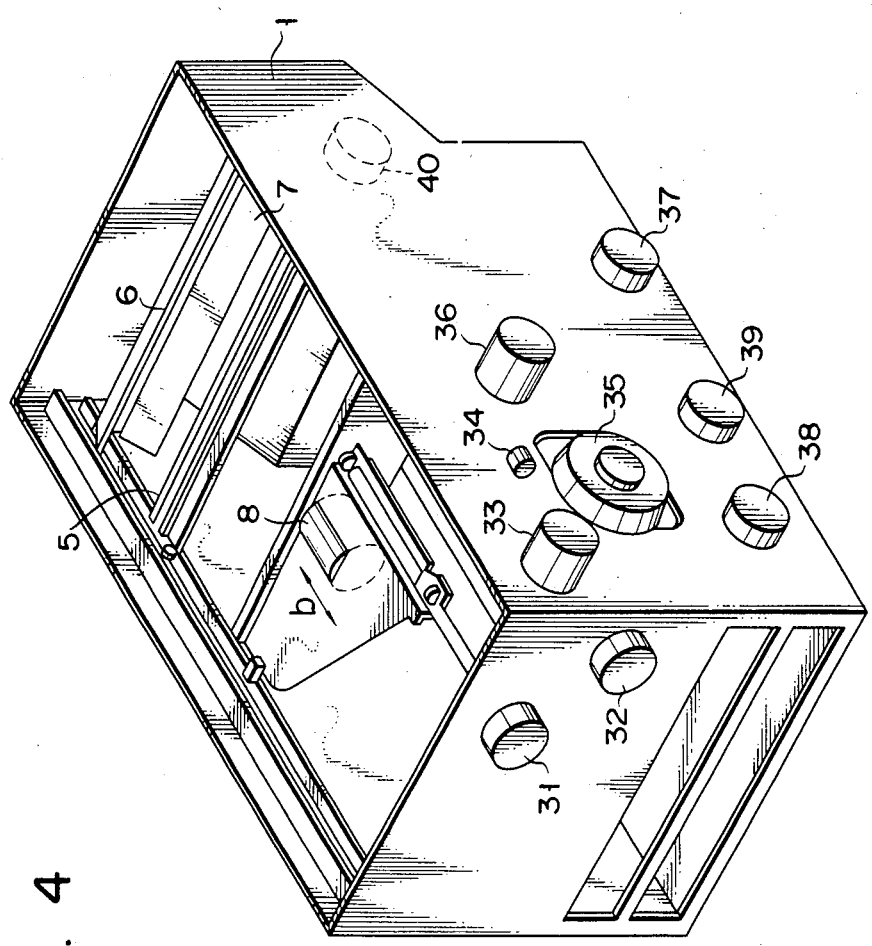

FIG. 4 shows a specific arrangement of drive sources for individual drive sections of the copying machine constructed in the aforesaid manner. The drive sources include the following motors. Numeral 31 designates a motor for lens drive. The lens drive motor 31 serves to shift the position of the lens block 8 for magnification or reduction. Numeral 32 designates a motor for mirror drive. The mirror drive motor 32 serves to change the distance (optical path length) between the mirror 5 and the mirrors 6 and 7 for magnifi-cation or reduction. Numeral 33 designates a stepping motor for scanning. The stepping motor 33 serves to move the exposure lamp 4 and the mirrors 5, 6 and 7 for scanning the original. Numeral 34 designates a motor for shutter drive. The shutter drive motor 34 serves to move a shutter (not shown) for adjusting the width of charging of the photosensitive drum 10 by the charger 11 at the time of magnification or reduction.

Numeral 35 designates a motor used for developing. The developing motor 35 serves to drive the developing roller and the like of the developing unit 12. Numeral 36 designates a motor used to drive the drum. The drum drive motor 36 serves to drive the photosensitive drum 10. Numeral 37 designates a motor for fixation. The fixing motor 37 serves to drive the sheet conveyor belt 22, the fixing roller pair 23, and the exit roller pair 24.

Numeral 38 designates a motor for paper supply. The paper supply motor 38 serves to drive the paper-supply rollers 15 and 16. Numeral 39 designates a motor for feeding sheets. The sheet feed motor 39 serves to drive the aligning roller pair 19. Numeral 40 designates a motor for fan drive. The fan drive motor 40 serves to drive the cooling fan 29.

Figure 5:
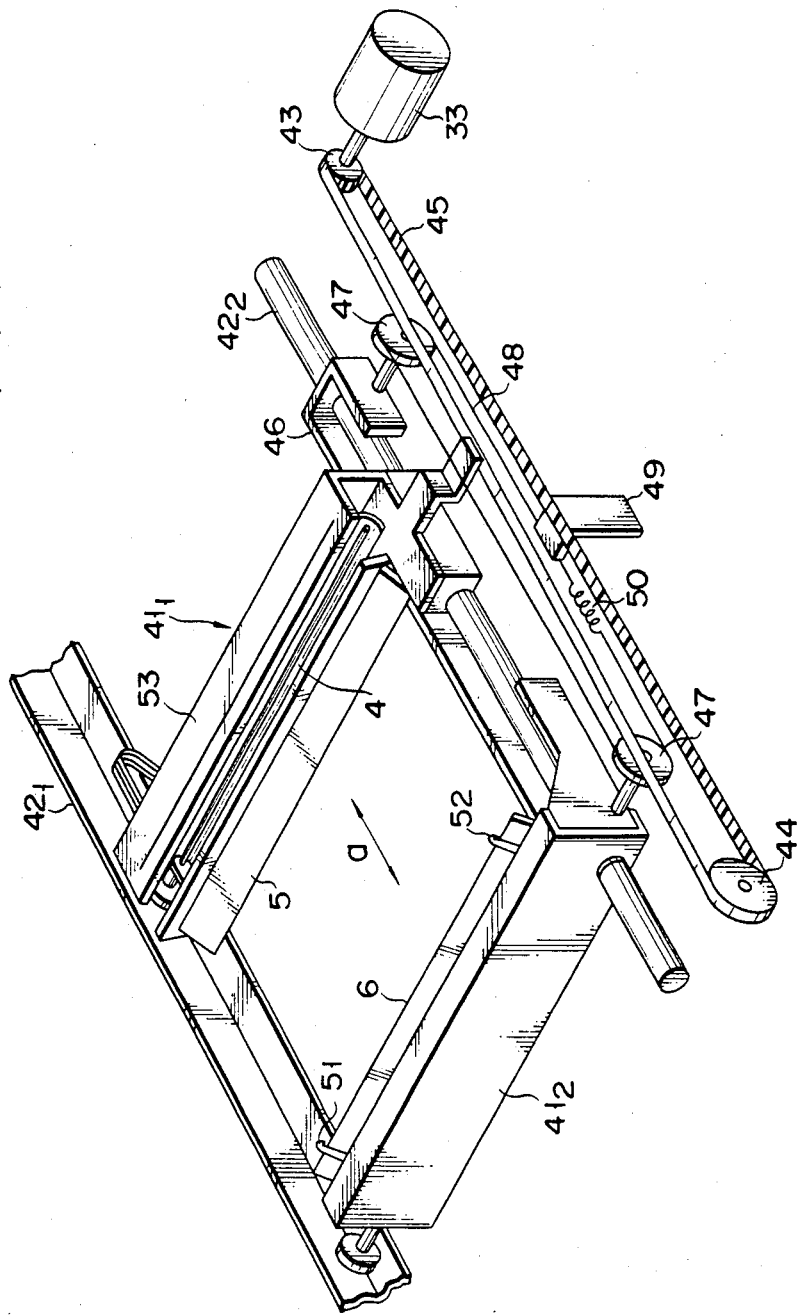

FIG. 5 shows a drive mechanism for reciprocating the optical system 3. The mirror 5 and the exposure lamp 4 are supported by a first carriage $41_1$, and the mirrors 6 and 7 by a second carriage $41_2$. These carriages $41_1$ and $41_2$ can move parallel in the direction indicated by arrow a, guided by guide rails $42_1$ and $42_2$. The four-phase stepping motor 33 drives a pulley 43. An endless belt 45 is stretched between the pulley 43 and an idle pulley 44, and one end of the first carriage $41_1$ supporting the mirror 5 is fixed to the middle portion of the belt 45.

On the other hand, two pulleys 47 are rotatably attached to a guide portion 46 (for the rail $42_2$) of the second carriage $41_2$ supporting the mirrors 6 and 7, spaced in the axial direction of the rail $42_2$. A wire 48 is stretched between the two pulleys 47. One end of the wire 48 is connected directly to a fixed portion 49, while the other end is connected thereto by means of a coil spring 50. The one end of the first carriage $41_1$ is fixed to the middle portion of the wire 48.

With this arrangement, when the stepping motor 33 is driven, the belt 45 turns around to move the first carriage $41_1$. As the first carriage $41_1$ travels, the second carriage $41_2$ also travels. Since the pulleys 47 then serve as movable pulleys, the second carriage $41_2$ travels in the same direction as and at a speed half that of the first carriage $41_1$. The traveling direction of the first and second carriages $41_1$ and $41_2$ is controlled by changing the rotating direction of the stepping motor 33.

The original table 2 carries thereon an indication of a reproducible range corresponding to the size of designated paper sheets. If the sheet size designated by the sheet selection keys $30_4$ and the copy ratio specified by the ratio setting keys $30_6$ or $30_7$ are (Px, Py) and K, respectively, the reproducible range (x, y) is given by $x = Px/K$, $y = Py/K$.

Out of the coordinates (x, y) designating any point within the reproducible range, as shown in FIG. 1, the x coordinate is indicated by indexes 51 and 52 arranged on the inside of the original table 2, and the y coordinate by a scale 53 provided on the top face portion of the first carriage $41_1$.

Figure 6:
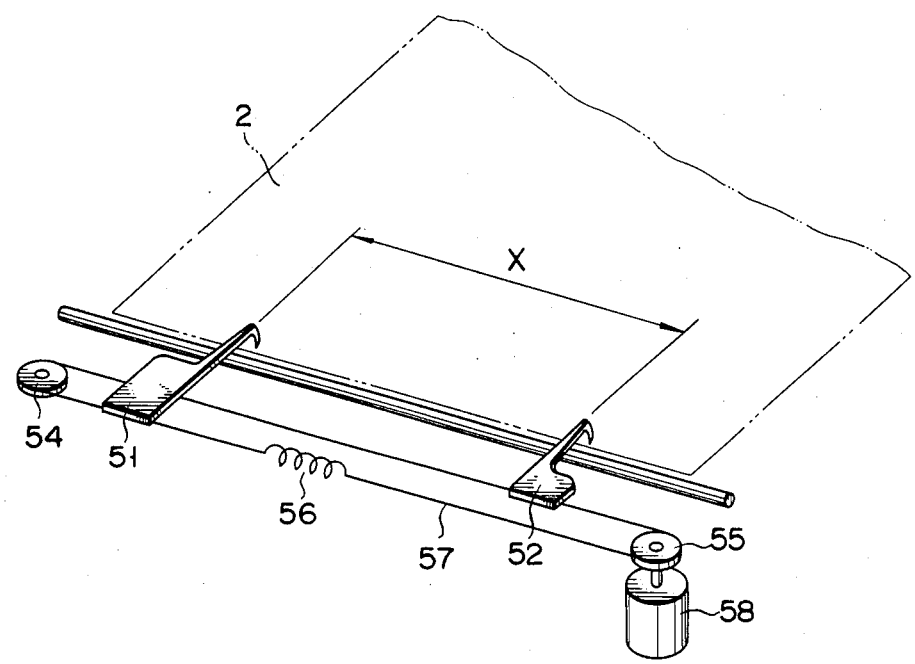

As shown in FIG. 6, the indexes 51 and 52 are attached to a wire 57 which is stretched between pulleys 54 and 55 through the aid of a spring 56. The pulley 55 is rotated by a motor 58. The distance between the indexes 51 and 52 can be changed by driving the motor 58 in accordance with the sheet size and the enlargement or reduction ratio.

The first carriage $41_1$ moves to a predetermined position (home position depending on the enlargement or reduction ratio) as the motor 33 is driven in accordance with the sheet size and the ratio. When the copy key $30_1$ is depressed, the first carriage $41_1$ is first moved toward the second carriage $41_2$. The lamp 4 is lighted and the first carriage $41_1$ is moved away from the second carriage $41_2$. When the original scanning ends, the lamp 4 is turned off, and the first carriage $41_1$ is returned to the home position.

Figure 7:
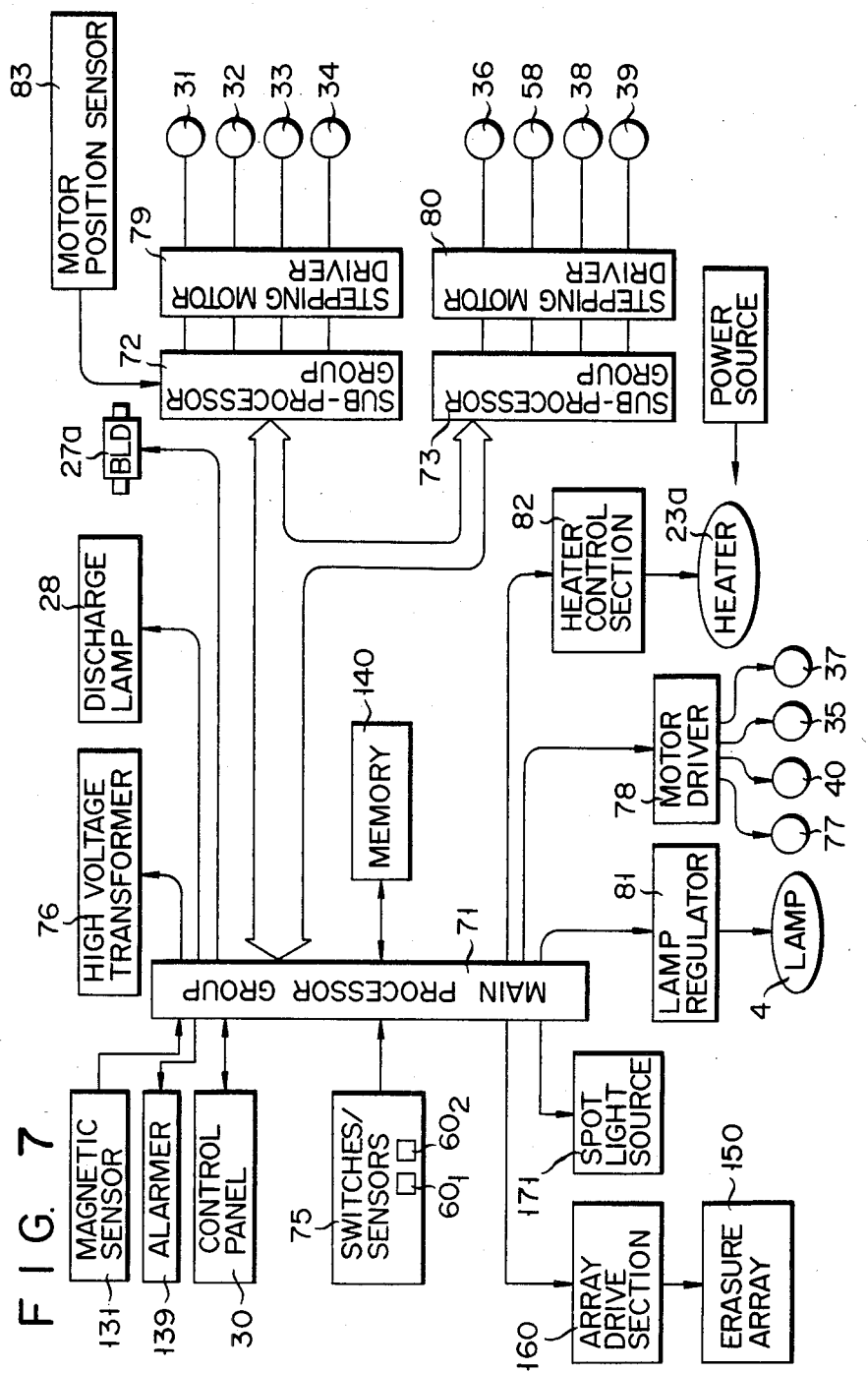

FIG. 7 shows a general control circuit of the electronic copying machine. This control circuit is mainly composed of a main processor group 71 and first and second sub-processor groups 72 and 73. The main processor group 71 detects input data from the control panel 30 and a group of input devices 75 including various switches and sensors, such as the cassette size detection switches $60_1$ and $60_2$ and controls a high-voltage transformer 76 for driving the chargers, the discharge lamp 28, a blade solenoid 27a of the cleaner 27, a heater 23a of the fixing roller pair 23, the exposure lamp 4, and the motors 31 to 40 and 58, thus accomplishing the copying operation. The main processor group 71 also controls a spot light source 171, a pulse motor 135, an erasure array 150, an array drive section 160, and a memory 160, thereby erasing any unnecessary portions of the original. These components 171, 135, 150, 160 and 140 will be described in detail later. Main processor group 71 controls magnetic sensor 131 (to be described later), pulse motor 135 for driving sensor 131, and the like. Group 71 detects a secret document in accordance with an output signal from sensor 131, and controls the operation of the copying machine or driving alarm or alarmer 139, comprising a buzzer, accordingly.

The motors 35, 37 and 40 and a toner-supply motor 77 for supplying the toner to the developing unit 12 are connected through a motor driver 78 to the main processor group 71 to be controlled thereby. The motors 31 to 34 and 95 are connected through a stepping motor driver 79 to the first sub-processor group 72 to be controlled thereby. The motors 36, 38, 39 and 58 are connected through a stepping motor driver 80 to the second sub-processor group 73 to be controlled thereby.

Further, the exposure lamp 4 is controlled by the main processor group 71 through a lamp regulator 81, and the heater 23a by the main processor group 71 through a heater control section 82. The main processor group 71 gives instructions for the start or stop of the individual motors to the first and second sub-processor groups 72 and 73. Thereupon, the first and second subprocessor groups 72 and 73 feed the main processor group 17 with status signals indicative of the operation mode of the motors. Also, the first sub-processor group 72 is supplied with positional information from a position sensor 83 for detecting the respective initial positions of the motors 31 to 34.

Figure 8:
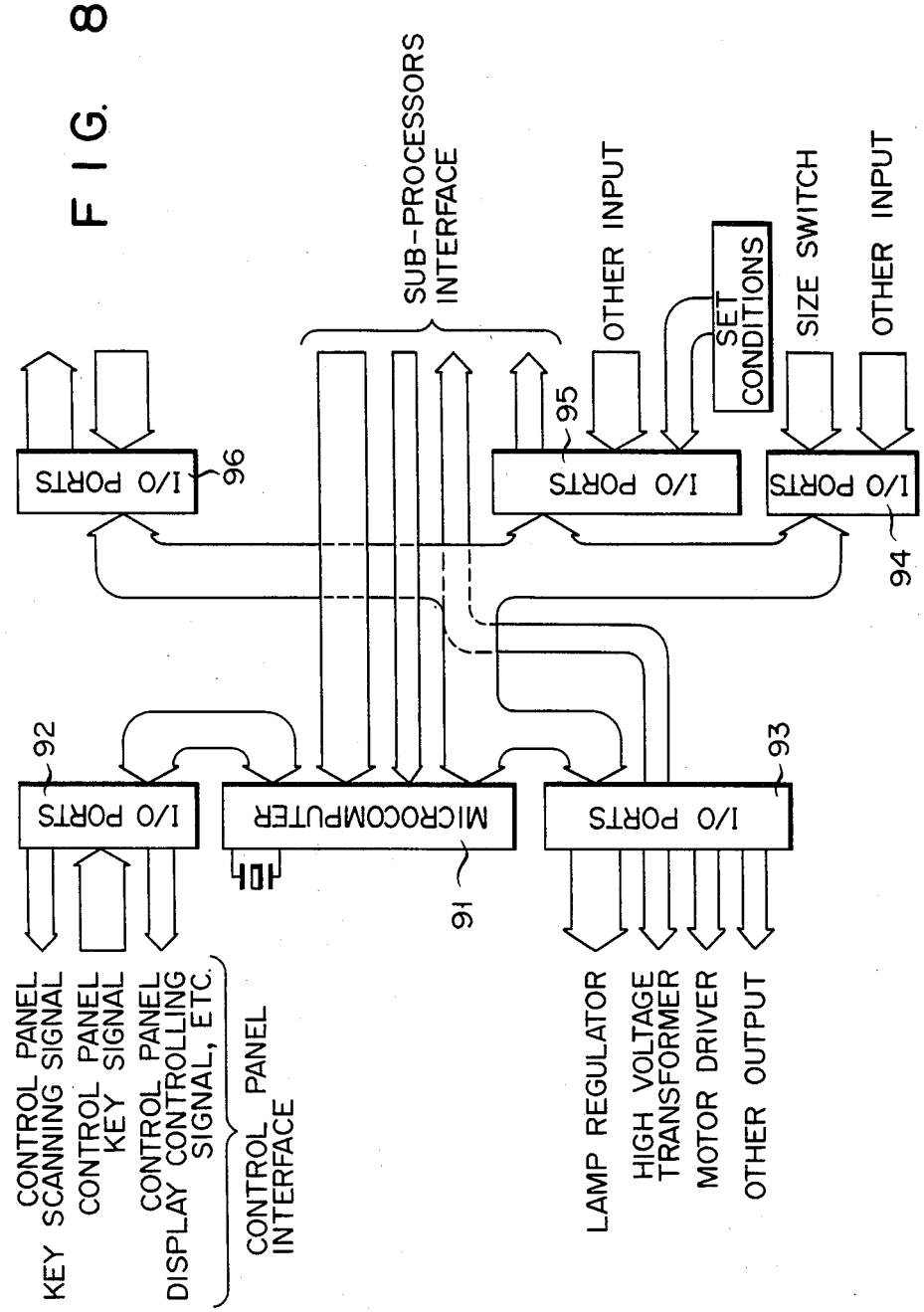

FIG. 8 shows an arrangement of the main processor group 71. Reference numeral 91 denotes a one-chip microcomputer (to be referred to as a CPU hereinafter). The CPU 91 detects key inputs at a control panel (not shown) through an I/O port 92 and controls display operations. The CPU 91 can be expanded through I/O ports 93 to 96. The port 93 is connected to a high-voltage transformer 76, a motor driver 78, a lamp regulator 81 and other outputs. The port 94 is connected to a size switch for detecting a paper size and other inputs. The port 95 is connected to a copying condition setting switch and other inputs. The port 96 is optional.

Figure 9:
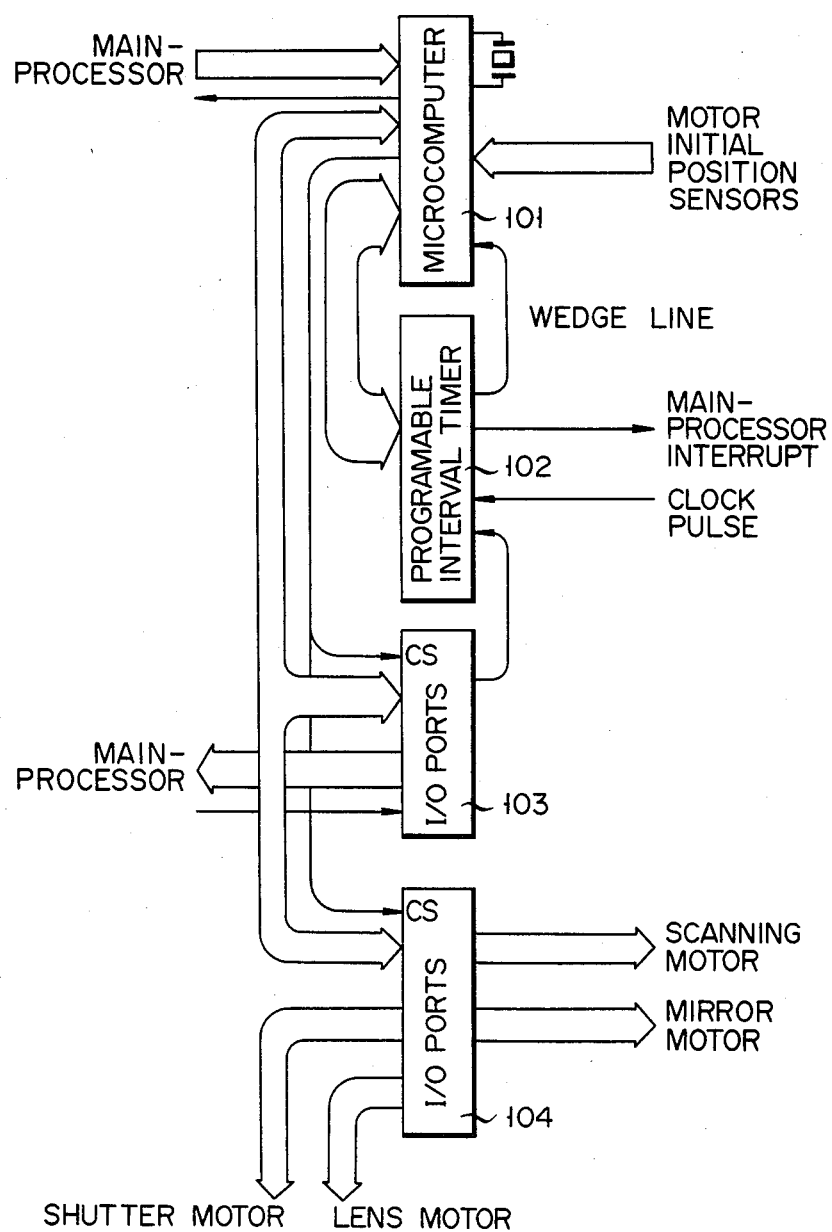

FIG. 9 shows an arrangement of the first subprocessor group 72. Reference numeral 101 denotes a CPU connected to the group 71. Reference numeral 102 denotes a programable interval timer for controlling switching time intervals. A preset value from the CPU 101 is set in the programable interval timer, and the timer is started. When the timer is stopped, the timer sends an end pulse onto an interrupt line of the CPU 101. The timer 102 receives a reference clock pulse. The CPU 101 receives position data from a position sensor 83 and is connected to I/O ports 103 and 104. The port 104 is connected to motors 31 to 34 and 135 through the stepping motor driver 79. The port 103 is used to supply a status signal from each stepping motor to the group 71.

Figure 10:
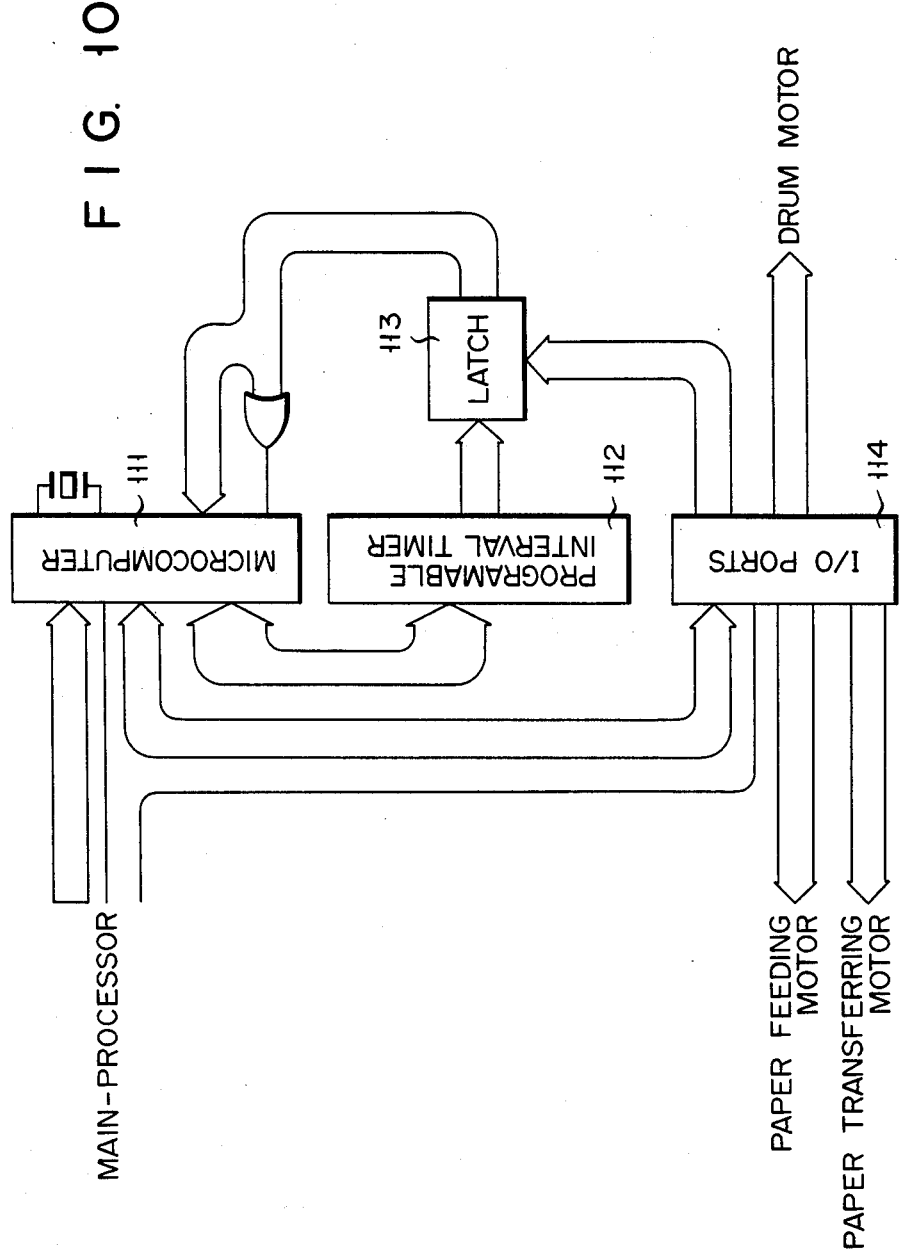

FIG. 10 shows an arrangement of the second subprocessor group 73. Reference numeral 111 denotes a CPU connected to the group 71. Reference numeral 112 denotes a programable interval timer for controlling switching time intervals of the pulse motors. A preset value from the CPU 111 is set in the programable interval timer, and the timer is started. When the timer is stopped, it generates an end pulse. The end pulse is latched by a latch 113, and an output therefrom is supplied onto the interrupt line of the CPU 111 and the input line of the I/O port. The CPU 111 is connected to an I/O port 114 which is then connected to motors 36, 38, 39 and 58 through the driver 80.

FIG. 11 shows a stepping motor control circuit. An I/O port 121 (corresponding to the ports 104 and 114 of FIGS. 9 and 10) is connected to a stepping motor driver 122 (corresponding to the drivers 79 and 80 of FIG. 7). The driver 122 is connected to windings A, $\overline{A}$, B and $\overline{B}$ of a stepping motor 123 (corresponding to the motors 31 to 34, 36, 38 and 39).

FIGS. 12A and 12B show a method of controlling a stepping motor speed. FIG. 12A shows a stepping motor speed curve, and FIG. 12B shows switching intervals. As is apparent from FIGS. 12A and 12B, the switching intervals are long at the beginning, are gradually decreased, and finally stop to decrease. Then, the intervals are prolonged, and the stepping motor is finally stopped. This cycle indicates the through-up and through-down of the pulse motor. The motor is started from the self starting region, operated in a high-speed region and is gradually stopped. Reference symbols $t_1$, $t_2$, ... $t_x$ denote times between the switching intervals.

Figure 13A:
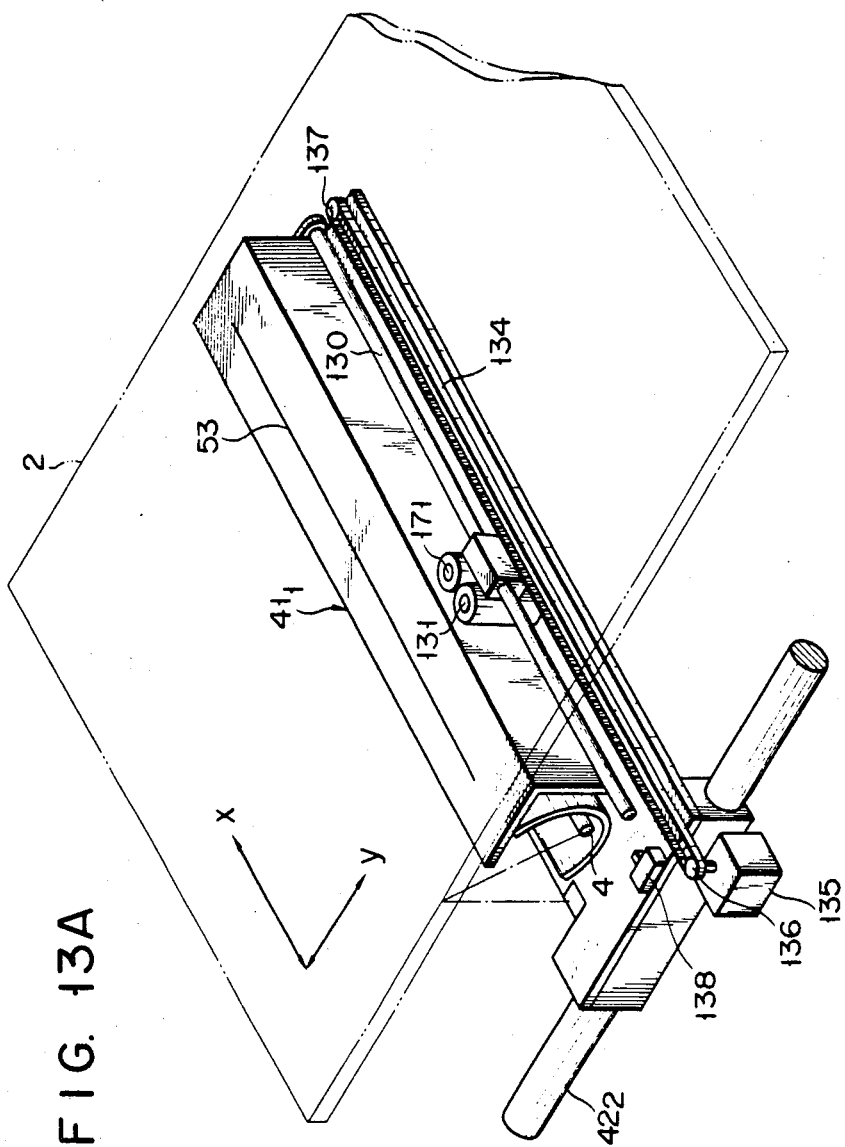
FIG. 13A is a perspective view of the principal part including a magnetic sensor and a spot light source.
Figure 13B:
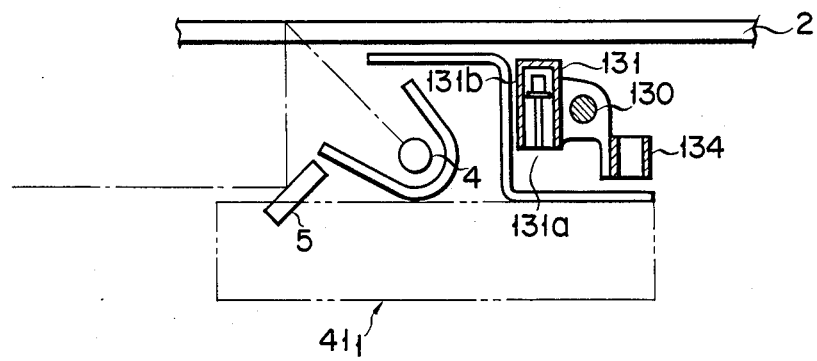
FIGS. 13B and 13C are side sectional views of the principal part including the magnetic sensor and the spot light source.
Figure 13C:
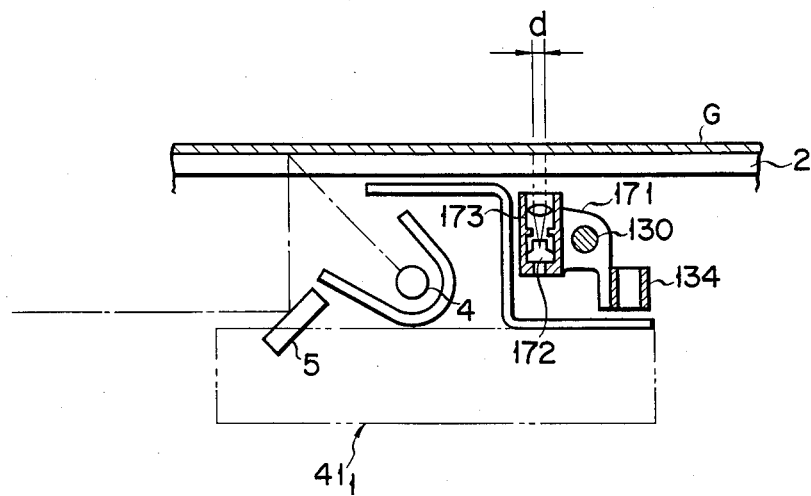

An original image erasure means and a secret document detecting means according to the first embodiment of the present invention will now be described. Referring to FIGS. 13A, 13B, and 13C, guide shaft 130 is arranged along a portion of first carriage $4_{11}$, and is shielded from light from exposure lamp 4. Magnetic sensor 131 serving as a secret document detecting means and spot light source 171 for specifying an erasure range of an original are movable along, and integrally with, guide shaft 130. Sensor 131 and light source 171 constitute a single unit, and they are movable in x and y directions, as shown in FIG. 14. Sensor 131 comprises case 131a mounted on shaft 130 and sensor unit 131b housed in case 131a. Light source 171 comprises light emitting element 172 (e.g., a light emitting diode or lamp) facing original table 2 and lens 173. Light emitted from element 172 is radiated onto document table 2 as spot light having spot size d. The spot light has sufficient luminance to transmit through original G, which is as thick as a post card, placed on original table 2.

Sensor 131 and light source 171 are coupled to timing belt (toothed belt) 134 arranged along guide shaft 130. Timing belt 134 is looped between pulley 136, mounted on a rotating shaft of stepping motor 135, and driven pulley 137. When stepping motor 135 is rotated, sensor 131 and light source 171 are moved in a direction perpendicular to the scanning direction of first carriage $41_1$. Position sensor 138, comprising a microswitch for detecting an initial position of sensor 131 and light source 171, is arranged on an edge portion of carriage $41_1$ at the side of stepping motor 135. When sensor 131 and light source 171 are moved, lower end portions thereof abut against position sensor 138, and an initial position thereof is detected.

Figure 15:
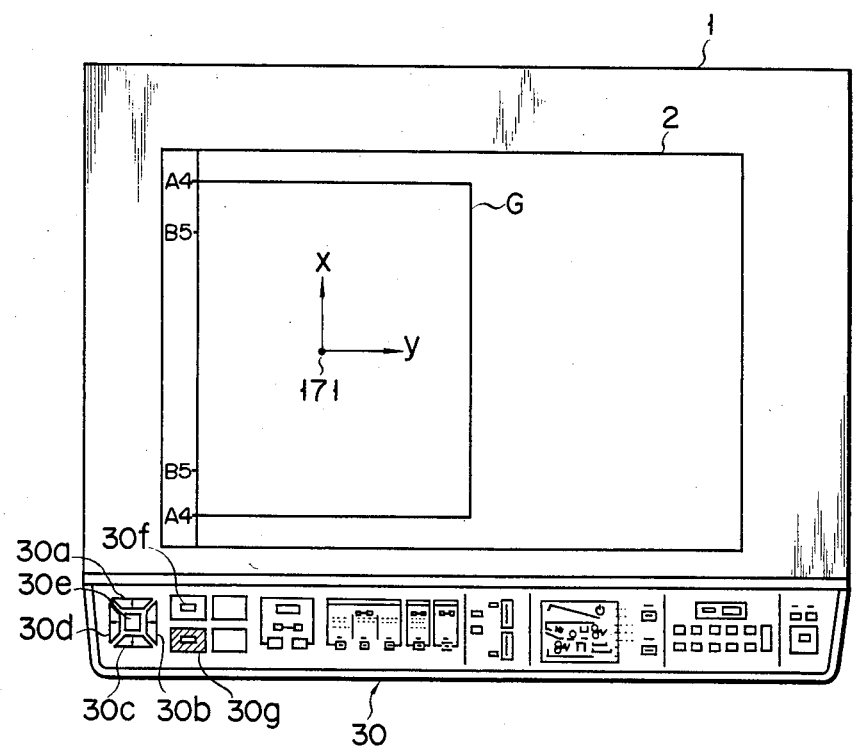
Figure 16:
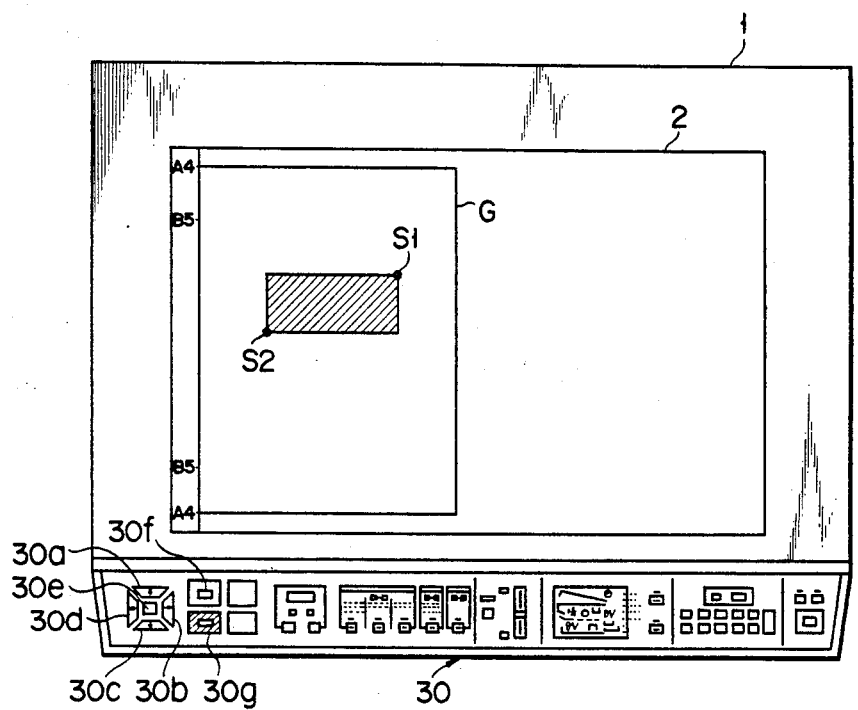
Figure 17:
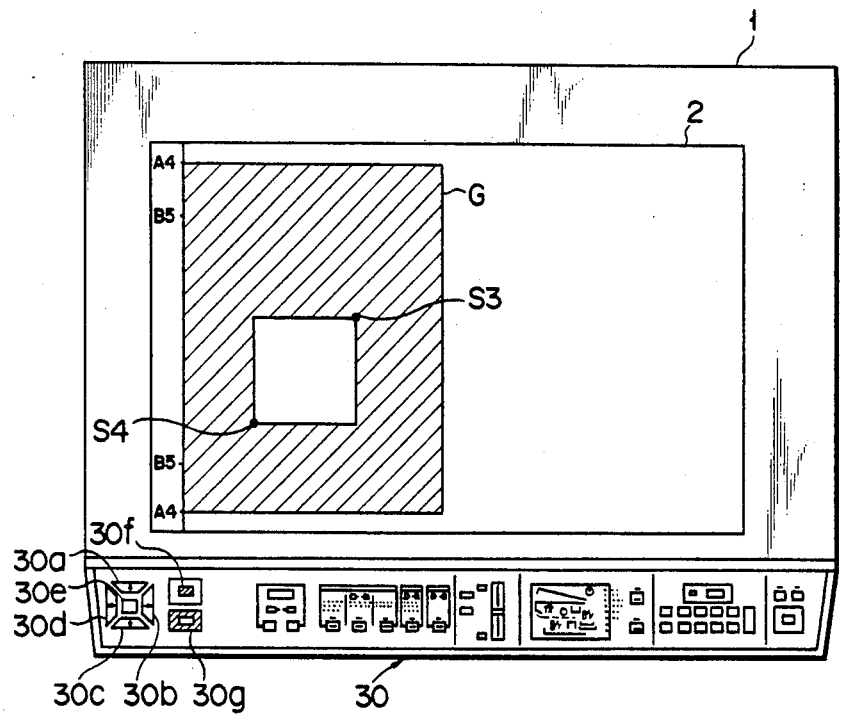

Referring now to FIGS. 15 to 17, there will be described a method for designating the erasure range of the original by means of the spot light source 171.

The spot light source 171 is moved by operating the operation keys 30a to 30d. When the operation keys 30b and 30d are depressed, the motor 33 is started, and the first carriage $41_1$ and the spot light source 171 are moved in the scanning direction (indicated by arrow y in FIG. 15). When the operation keys 30a and 30c are depressed, on the other hand, the motor 135 is started, and the spot light source 171 is moved in a direction (indicated by arrow x in FIG. 15) perpendicular to the scanning direction.

Observing the spot light transmitted through the original G, the operator operates the operation keys 30a to 30d. When the spot light reaches, for example, a spot S1 on the original G shown in FIG. 16, the operator depresses the position designating key 30e. Thereupon, the coordinate position (x1,y1) indicated by the spot S1 is stored in the main processor group 71 shown in FIG. 7. Likewise, if the position designating key 30e is depressed when a spot S2 on the original G is reached by the spot light the ition (x2,y2) of the spot S2 is stored in the main processor group 71. This position of the spot light can be detected by, for example, counting drive pulses delivered from the stepping motors 33 and 135. When the erasure range designating key 30f is depressed thereafter, a rectangular region (hatched region) having its two opposite vertexes on the spots S1 and S2 is designated as the erasure range, as shown in FIG. 16.

If the erasure range designating key 30g is depressed after designating spots S3 and S4 on the original G, the other region of the original G (i.e. not a square region having its two opposite vertexes on the spots S3 and S4) is designated as the erasure range, as shown in FIG. 17.

Figure 18A:
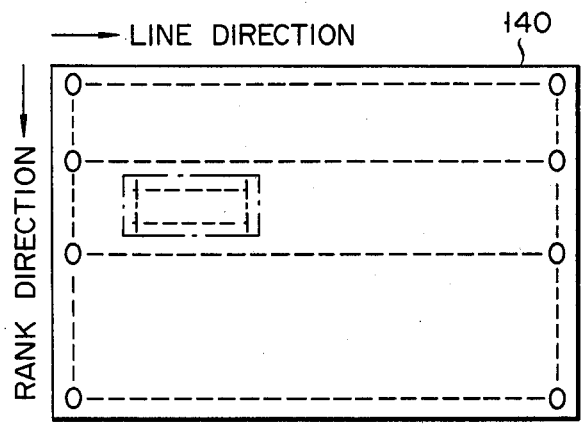
FIGS. 18A and 18B are plan views for explaining memory contents.
Figure 18B:
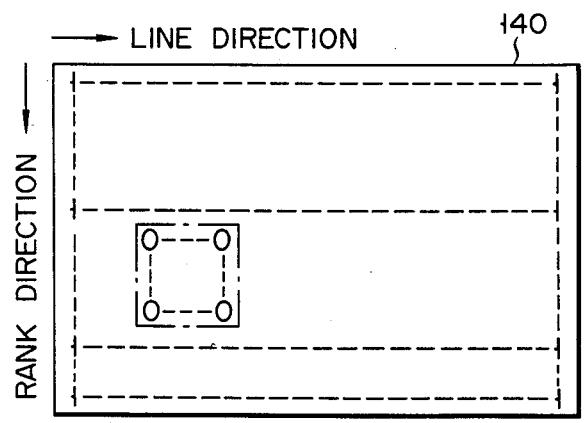

Thus, if the key 30f or 30g is depressed, the group 71 performs arithmetic operation in accordance with the specified two positions. Position data of the erasure area are set at logic "1" and position data of an area excluding the erasure area are set at logic "0". These position data are stored in the memory 140. A rank capacity of the memory 140 substantially corresponds to a value given by (moving distance of the source 171 along the x direction)÷(position resolution along the x direction). A line capacity of the memory 140 substantially corresponds to a value given by (moving distance of the source 171 along the y direction)÷(position resolution thereof along the y direction). The memory 140 comprises a RAM having the memory capacity described above. In the cases of FIGS. 16 and 17, high level signals are stored at addresses corresponding to the hatched area and low level signals are stored at other addresses in response to the data supplied from the group 71, as shown in FIGS. 18A and 18B, respectively.

In this manner, the original is placed on the original table such that the image surface faces upward. When an erasure area is specified, the original is turned over along fixed scale $2_1$ on table 2. Therefore, information stored in memory 140 shown in FIGS. 18A and 18B is stored such that column order is inverted in practice.

Figure 19A:
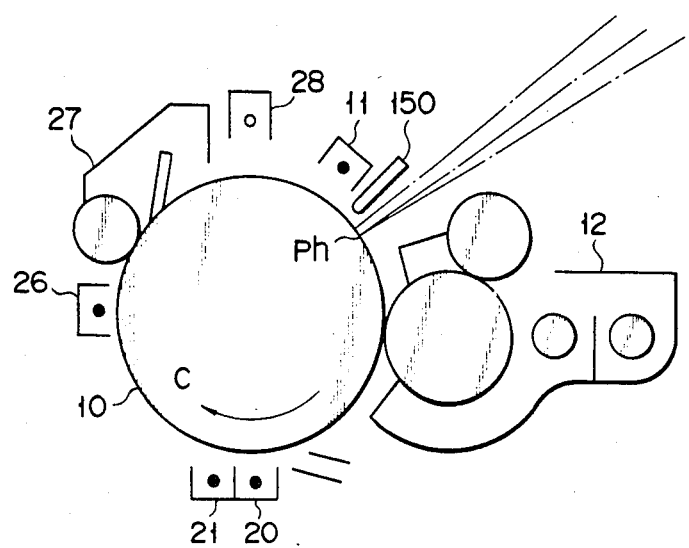
FIG. 19A is a side sectional view of the principal part showing an arrangement of the erasure array.
Figure 20:
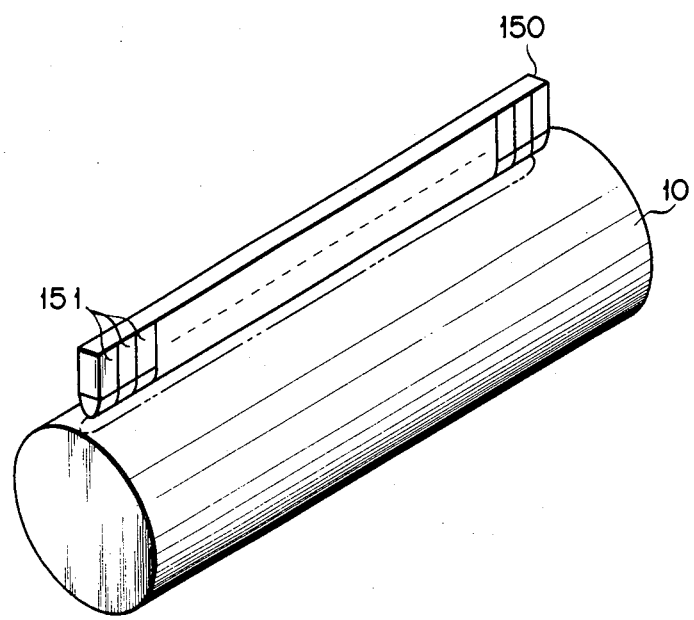
Figure 21:
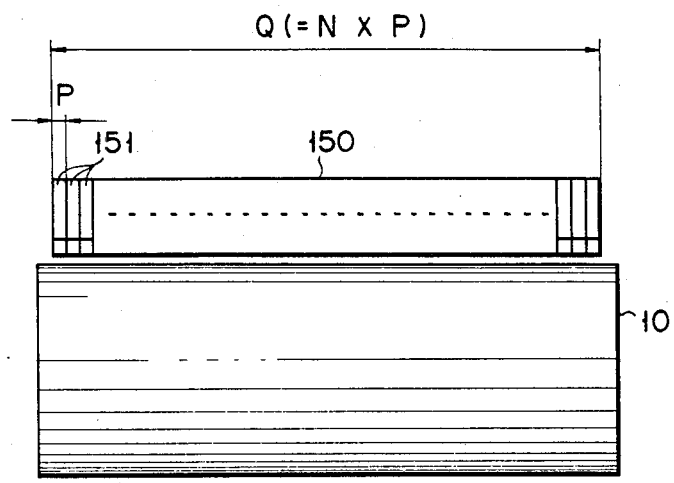
Figure 22A:
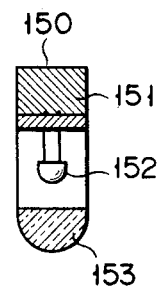
FIG. 22A is a side sectional view of the erasure array.
Figure 22B:
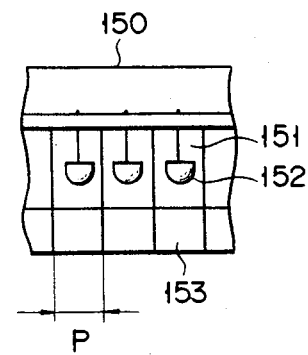
FIG. 22B is a partial front view of the erasure array.

As shown in FIG. 19A, on the other hand, the erasure array 150 as the erasing means is disposed close to the photosensitive drum 10, between the charger 11 and an exposure region Ph, for example. As shown in FIGS. 20 and 21, the erasure array 150 includes a plurality of shading cells 151 which are arranged in a direction perpendicular to the rotating direction of the photosensitive drum 10. As shown in FIGS. 22A and 22B, the cells 151 each contains therein a light emitting element 152 formed of, e.g., a light emitting diode. Moreover, a lens 153 for converging light from the light emitting element 152 on the surface of the photosensitive drum 10 is disposed at the opening portion of each cell 151 facing the photosensitive drum 10.

The number of light-emitting elements arranged in erasure array 150 corresponds to the same as the column capacity of memory 140. When the distance between light-emitting elements 152 is given by P and the number of elements is given by N, overall length Q of array 150 is given by $Q=N \cdot P$.

The array 150 is driven by an array drive section 160. As shown in FIG. 23, the section 160 comprises a shift register 161 having the same bit number as the rank bit number of the memory 140, a store register 162 for storing the content of the register 161, and a switching circuit 164 consisting of a plurality of switch elements 163 which are turned on/off in response to output signals from the register 162. Movable contacts 163a of the elements 163 are grounded, and stationary contacts 163b thereof are respectively connected to the cathodes of the elements (diodes) 152 constituting the array 150. The anodes of the elements 152 are connected to a power source VCC through the corresponding current limiting resistors R.

After, as the erasure area the unnecessary portion of the original is specified, he closes the original cover $1_1$ and depresses the key $30_1$. The carriage $41_1$ and drum 10 are driven, and one-rank data are sequentially read out along the line direction (FIGS. 18A and 18B of the memory 140. The readout data D1 are transferred to the register 161 in the section 160 in response to the clock signal CLK. After one-rank data is transferred to the register 161 and the charged portion of the drum 10 reaches the array 150, the group 71 generates a latch signal LTH. The storage data is supplied from the register 161 to the register 162 in response to the latch signal LTH. Since the array 150 is arranged between the charger 11 and the exposure portion Ph, the output timing of the latch signal LTH is controlled such that the one-rank data is transferred from the memory 140 to the register 162 prior to $\theta 1/\omega$ where $\theta 1$ is the angle between the array 150 and the portion Ph and $\omega$ is the peripheral velocity of the drum 10.

The elements 163 in the circuit 164 are controlled in response to the output signal from the register 162. When the output of the register 162 is set at high level, the elements 163 are turned on. When the output of the register 162 is set at low level, the elements 163 are turned off. The elements 152 connected to the elements 163 are turned on when the elements 163 are turned on. Otherwise, the elements 152 are turned off. A charged drum portion corresponding to the ON elements 152 is discharged, and the remaining portion is not discharged, so that a latent image is not formed in the discharged portion even if the surface of the drum 10 is exposed with light. In this manner, the unnecessary portion for one rank if erased. The data is thus read out from the memory 140 in units of ranks, thereby erasing the unnecessary image portion.

Figure 24:
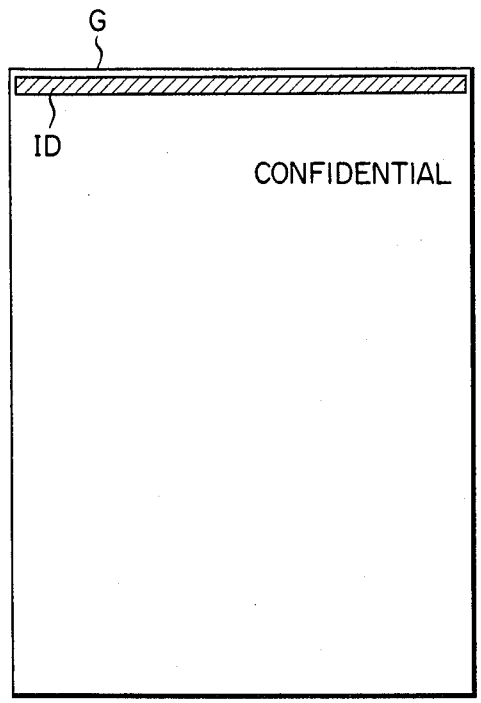

As shown in FIG. 24, identification portion ID comprising a magnetic member is arranged along one side of original G containing a secret document. Portion ID comprises, e.g., an inconspicuous magnetic tape.

Figure 26:
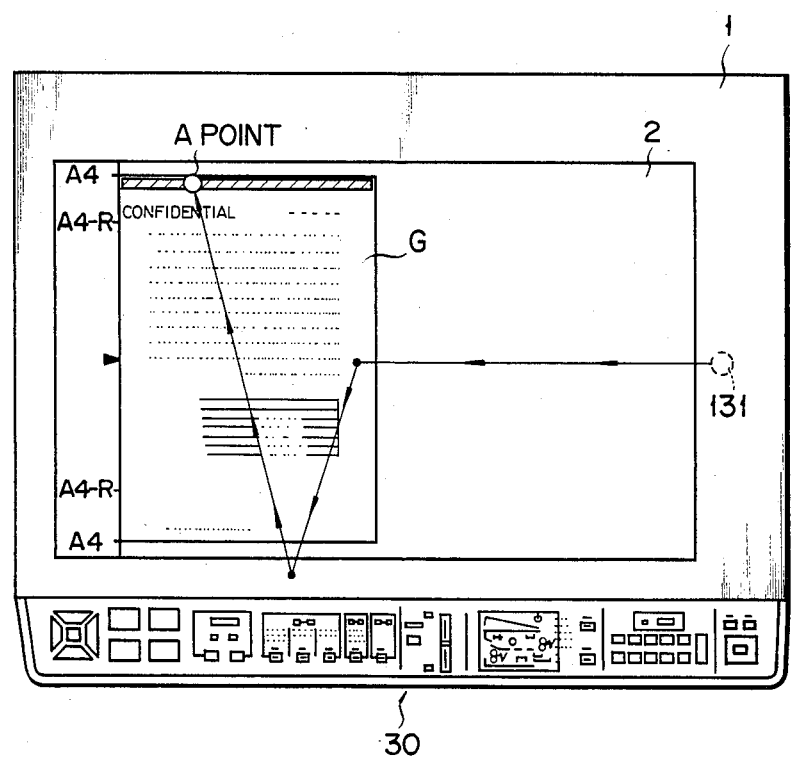

An operation for detecting the secret document with the above arrangement will now be explained. As shown in FIG. 25, first carriage $41_1$ is normally fixed in position Q farthest from startionary scale $2_1$. Original G is placed with reference to the center of scale $2_1$. When copy key $30_1$ is operated in this state, carriage $41_1$ returns toward scale $2_1$ at high speed under the control of main processor group 71. In this case, sensor 131 is moved as shown in FIG. 25 (i.e., two dimensionally). When sensor 131 passes by portion ID during its return movement, the output signal from sensor 131 goes from LOW level to HIGH level. When original G is placed as shown in FIGS. 26 and 27, portion ID is detected by sensor 131 at point A or B during the return movement. When main processor group 71 detects the HIGH-level output signal, it determines that the original placed on table 2 contains a secret document. As a result, when carriage $41_1$ reaches scale $2_1$, it is stopped and a copying operation is no longer performed. At this time, main processor group 71 supplies an alarm signal to alarm 139. Therefore, alarm 139 is driven to signal that a secret document is about to be copied. After a predetermined period of time has passed, carriage $41_1$ is returned to a position farthest from scale $2_1$ under the control of main processor group 71, thus disabling alarm 139. When original G placed on table 2 is a normal original, a normal copying operation is carried out after carriage $41_1$ is returned.

In this embodiment, identification portion ID is provided along one side of an original, and is sensed by two-dimensional movement of sensor 131, thereby detecting a secret document and protecting it from being copied. Therefore, duplication of the secret document can be reliably prevented. In addition, when an original containing a secret document is detected, an alarm sound is generated. Therefore, attempted duplication of a secret document can be signaled to a third person.

Since sensor 131 is arranged integrally with spot light source 171 for trimming an original, a convey means (e.g., a motor, a timing belt, a guide, and the like) can be used in common. Therefore, discrimination of a secret document and original trimming (selection of image forming region) can be two-dimensionally performed with an apparatus having a simple arrangement.

Since identification portion ID is detected by two dimensional movement of sensor 131, it can be detected if an original is placed on any portion of original table 2. In this case, sensor 131 is moved as shown in FIG. 28.

Furthermore, first carriage $41_1$ is fixed in a position farthest from stationary scale $2_1$. When an copying operation starts, carriage $41_1$ is returned to detect identification portion ID. Therefore, detection speed is high.

Figure 19B:
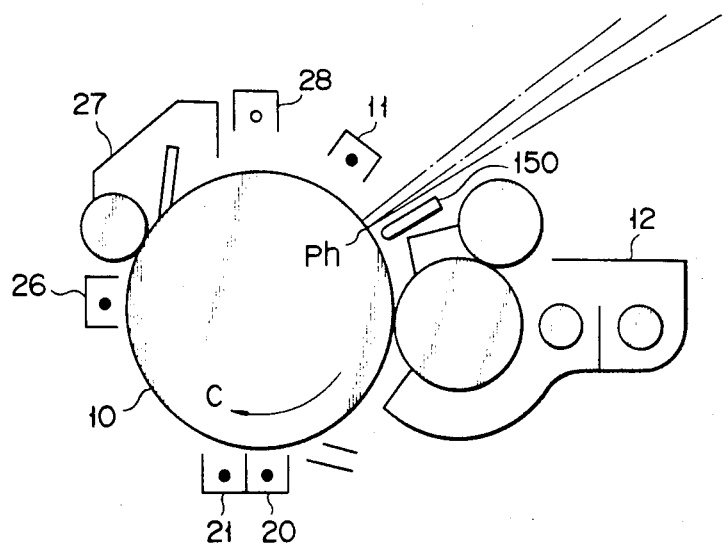
FIG. 19B is a side sectional view of the principal part showing another arrangement of the erasure array.

In the above embodiment, alarm 139 is used as a signaling means. For example, a transmitter can be used in place of alarm 139. The transmitter modulates an alarm signal to transmit it to a receiver at a distant location, and the receiver demodulates the alarm signal to drive an alarm. With this arrangement, attempted duplication of a secret document at a distant location can be signaled. In the above embodiment, identification portion ID is arranged along one side of original G. However, the present invention is not limited to this, and identification portion ID can be arranged on a portion of original G, as shown in FIG. 29. In this case, movement of sensor 131 is finer. In addition, erasure array 150 need not be arranged between charger 11 and exposure portion Ph, as shown in FIG. 19A, but can be arranged between portion Ph and developer 12, as shown in FIG. 19B so as to erase a latent image in accordance with a corresponding designation.

Figure 30:
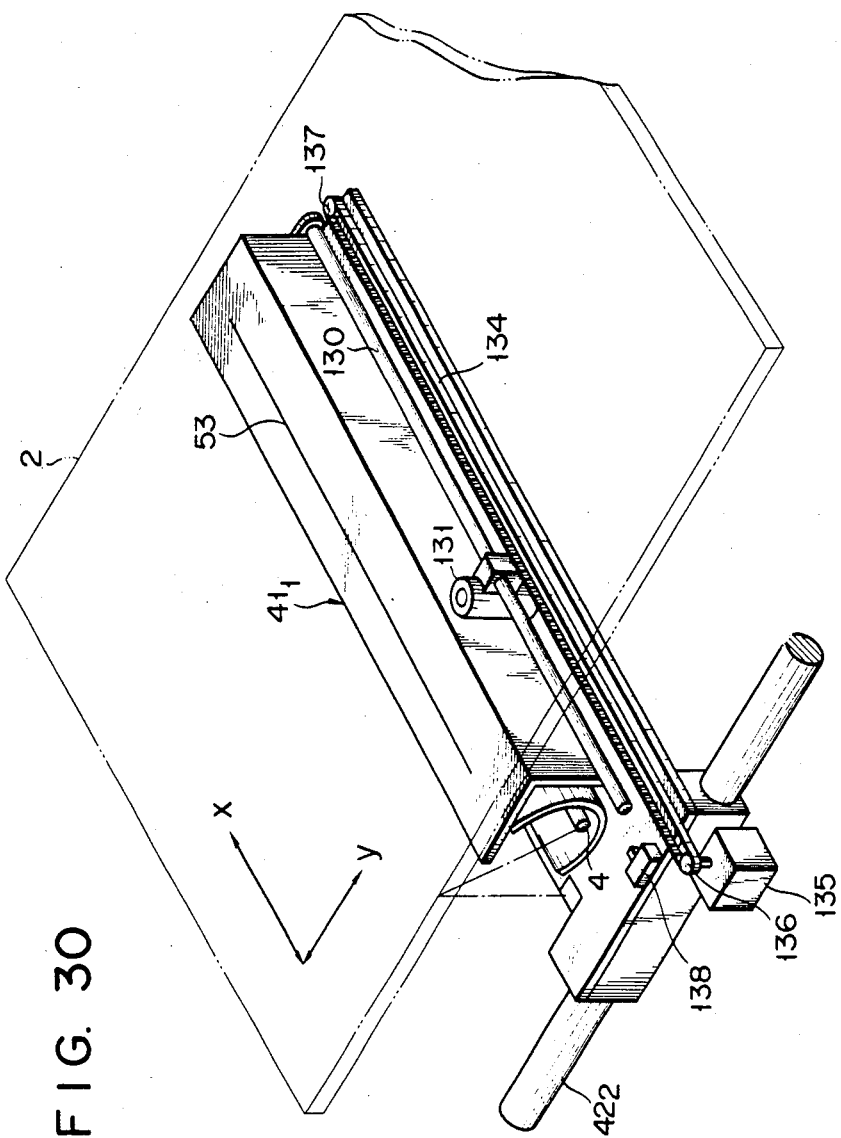
Figure 31:
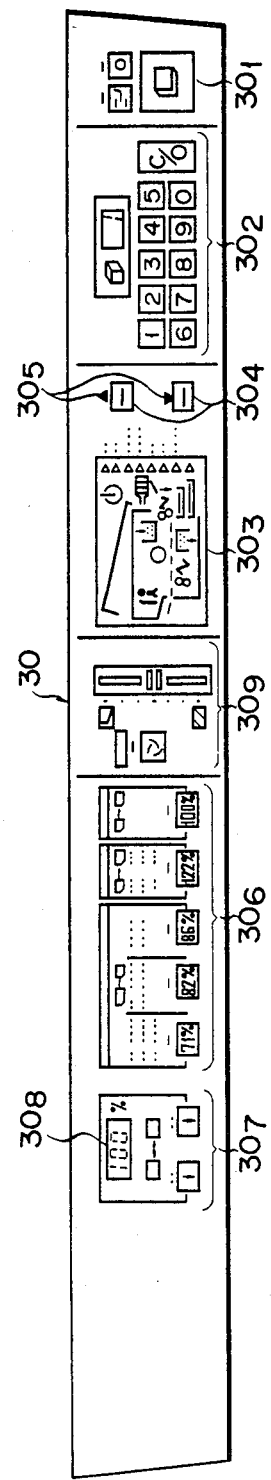
Figure 32:
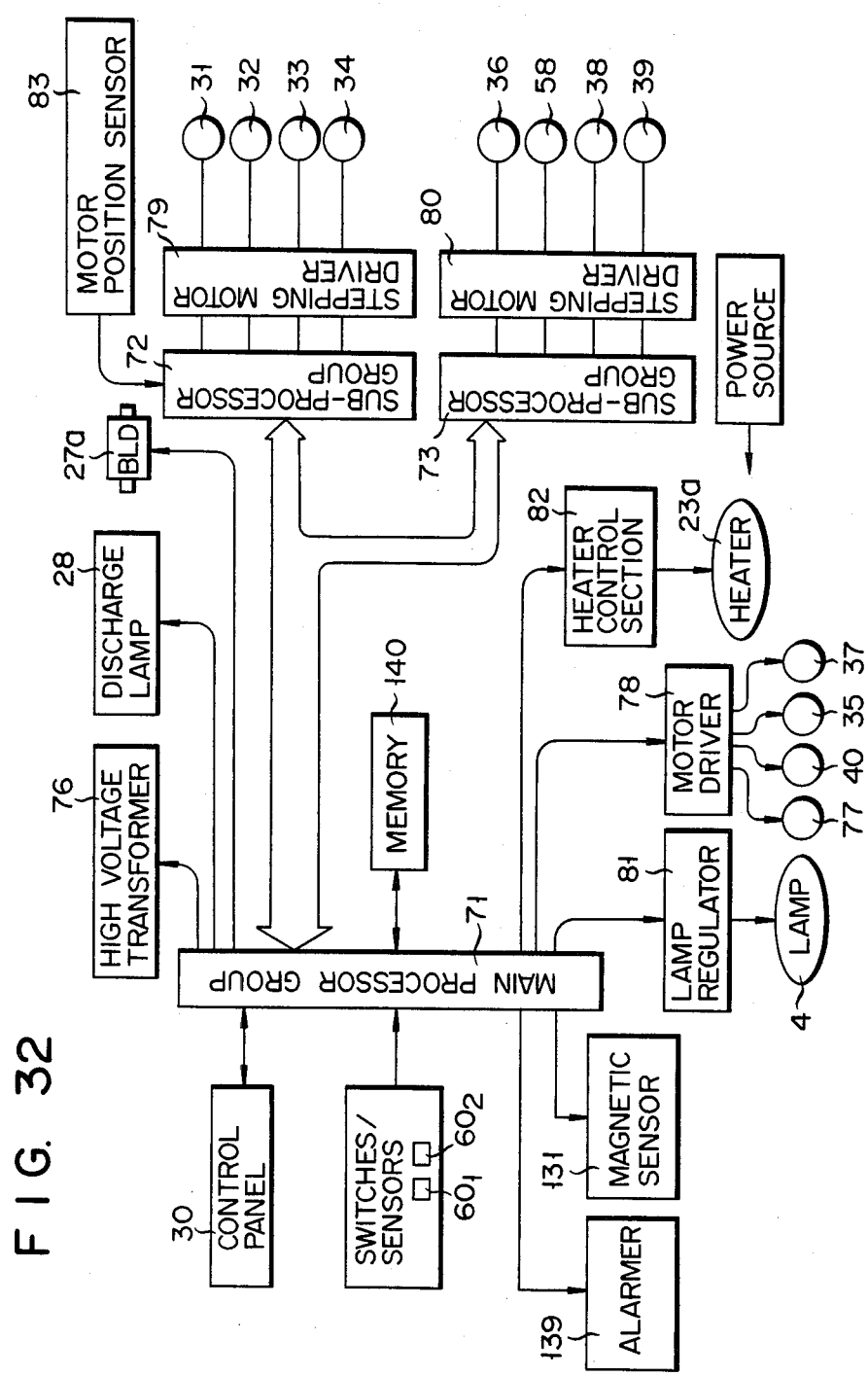

A second embodiment of the present invention will now be described. As shown in FIGS. 30 to 32, keys 30a to 30g for original trimming, spot light source 171, array drive mechanism 160, and erasure array 150 are omitted from the arrangement of the first embodiment. Therefore, the arrangement of the second embodiment only comprises magnetic sensor for preventing secret document copying and alarm 139. Other arrangements of the second embodiment are the same as those of the first embodiment, and a description thereof will be omitted. According to the second embodiment, only a normal copying function and a secret document copying prevention function in the first embodiment are executed.

Figure 33A:
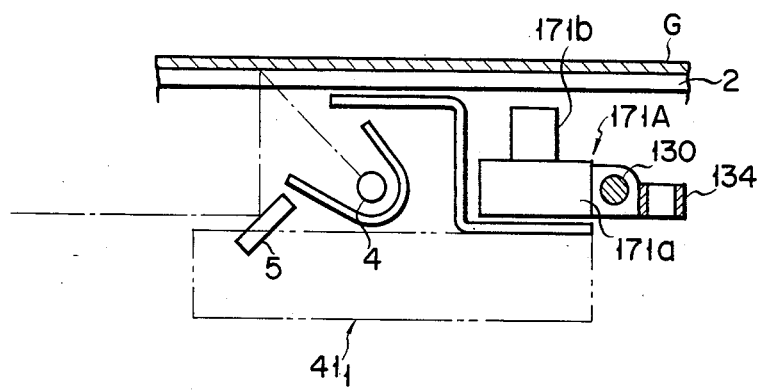
Figure 33B:
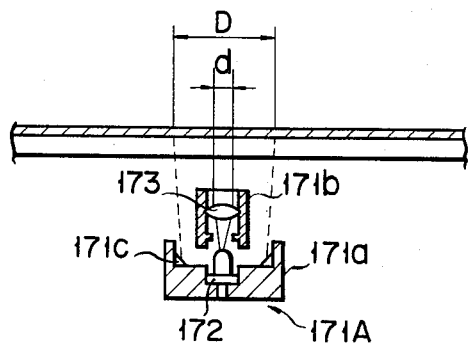
Figure 33C:
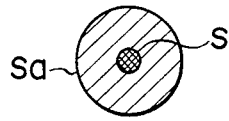

A third embodiment of the present invention will now be described. In the third embodiment, spot light source 171 for original trimming in the first embodiment is improved, as shown in FIGS. 33A and 33B. Spot light source 171A has large-diameter portion 171a concentrically arranged on small-diameter portion 171b. Light emitting element 172 (e.g., a light emitting diode or lamp) is arranged on a central portion of large-diameter portion 171a to face original table 2. Lens 173 is arranged on small-diameter portion 171b so as to focus light emitted from element 172 onto original table 2 as spot light having a very small spot size. Reflecting member 171c for directing light emitted from element 172 onto original table 2 through a surrounding portion of small-diameter portion 171b is arranged around element 172 of large-diameter portion 171a. Therefore, when element 172 is illuminated, auxiliary light Sa of diameter D is radiated around spot light S of diameter d on original table 2, as shown in FIG. 33C. Spot light S and auxiliary light Sa have sufficient luminance to transmit through original G, which is as thick as a post card, placed on original table 2.

Since spot light source 171A with the above arrangement radiates auxiliary light Sa around spot light S, even if the spot size of spot light S is decreased in accordance with an erasure pitch or if original G is placed to face down, the position of spot light S can be easily confirmed.

Since auxiliary light Sa is produced using remaining light from light emitting element 172 for emitting spot light S, another light source need not be provided.

What is claimed is:

1. An image forming apparatus having a function for checking copying of a secret document and a function for selecting an image forming area, said apparatus comprising:
    an original table on which an original is placed, said original, if it is a secret document, being provided with a predetermined identification section;
    original scanning means, movable along said original table, for optically scanning said orginal placed on said original table to obtain image data;
    image forming means for forming an image corresponding to the image data from said original scanning means on an image forming medium;
    secret document detecting means provided integrally with said original scanning means and having a sensor for detecting the predetermined identification section of the secret document;
    first controlling means for driving said document scanning means prior to an image forming operation by said original scanning means and said image forming means, and for generating a first control signal for two-dimensionally scanning the original placed on said original table with said sensor of said secret document detecting means;
    second controlling means for generating a second control signal for enabling or disabling the image forming operation in accordance with a detection result from said secret document detecting means, thereby preventing copying of the secret document;
    light-transmitting means, arranged integrally with said original scanning means, for emitting transmitting light on the original placed on said original table;
    erasure portion specifying means for supplying a command for displacing a position of a transmitting light component so that an unnecessary portion of the original is specified as an erasure portion in accordance with the position of the transmitting light component on the original by the transmitting light from said light-transmitting means prior to the image forming operation;
    third controlling means for generating a third control signal for driving said original scanning means in accordance with the displacement command of the transmitting light component, thereby moving said light-transmitting means to a position corresponding to the displacement command of the transmitting light component;
    erasure portion storage means for storing given erasure position data indicating a position of the erasure portion specified by said erasure portion specifying means;
    image erasing means for selectively erasing image data to be transferred by said image forming means; and
    fourth controlling means for reading out the erasure position data stored in said erasure position storage means during the image forming operation to supply the readout data to said image erasing means.

2. An apparatus according to claim 1, wherein said identification section is arranged along one side of the secret document.

3. An apparatus according to claim 1, wherein said identification section is arranged at a given position on the secret document.

4. An apparatus according to claim 1, wherein said identification section is a magnetic medium, and said sensor is a magnetic sensor.

5. An apparatus according to claim 1, wherein said first controlling means drives said original scanning means from a position farthest from an original placement reference position on said original table as a starting point.

* * * * *